US007659562B2

(12) United States Patent
Ko et al.

(10) Patent No.: US 7,659,562 B2
(45) Date of Patent: Feb. 9, 2010

(54) ELECTRIC FIELD READ/WRITE HEAD AND METHOD OF MANUFACTURING SAME AND DATA READ/WRITE DEVICE

(75) Inventors: Hyoung-soo Ko, Yongin-si (KR); Ju-hwan Jung, Yongin-si (KR); Yong-su Kim, Yongin-si (KR); Seung-bum Hong, Yongin-si (KR); Hong-sik Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 89 days.

(21) Appl. No.: 11/723,567

(22) Filed: Mar. 21, 2007

(65) Prior Publication Data
US 2008/0030909 A1 Feb. 7, 2008

(30) Foreign Application Priority Data
Aug. 2, 2006 (KR) .................. 10-2006-0072925

(51) Int. Cl.
*H01L 29/76* (2006.01)
*H01L 29/94* (2006.01)
*H01L 31/062* (2006.01)
*H01L 31/113* (2006.01)
*H01L 31/119* (2006.01)
*H01L 29/34* (2006.01)
*H01L 29/74* (2006.01)
*H01L 31/111* (2006.01)
*H01L 27/14* (2006.01)
*H01L 29/82* (2006.01)
*H01L 29/84* (2006.01)
*H01L 43/00* (2006.01)
*G11B 5/187* (2006.01)
*G11B 9/00* (2006.01)

(52) U.S. Cl. .................. 257/288; 257/108; 257/295; 257/414; 257/422; 257/423; 257/424; 257/425; 257/426; 257/427; 257/E27.005; 257/E27.006; 257/E27.008; 257/E29.164; 257/E29.167; 257/E29.272; 257/E29.323; 360/122; 369/126

(58) Field of Classification Search .................. 257/108, 257/295, 414, 422–427, E27.005, E27.006, 257/E27.008, E29.164, E29.167, E29.272, 257/E29.323, 288; 360/122; 369/126
See application file for complete search history.

(56) References Cited

U.S. PATENT DOCUMENTS 4,499,515 A * 2/1985 Piotrowski et al. .......... 360/328
4,520,413 A   5/1985 Piotrowski et al.

(Continued)

FOREIGN PATENT DOCUMENTS

KR   2003-0087372 A   11/2003

*Primary Examiner*—Ida M Soward
(74) *Attorney, Agent, or Firm*—Sughrue Mion, PLLC

(57) ABSTRACT

An electric field read/write head, a method of manufacturing the same, and a data read/write device including the electric field read/write head are provided. The data read/write device includes an electric field read/write head which reads and writes data to and from a recording medium. The electric field read/write head includes a semiconductor substrate, a resistance region, source and drain regions, and a write electrode. The semiconductor substrate includes a first surface and a second surface with adjoining edges. The resistance region is formed to extend from a central portion at one end of the first surface to the second surface. The source region and the drain region are formed at either side of the resistance region and are separated from the first surface. The write electrode is formed on the resistance region with an insulating layer interposed between the write electrode and the resistance region.

37 Claims, 10 Drawing Sheets

U.S. PATENT DOCUMENTS

| | | | |
|---|---|---|---|
| 5,506,737 A * | 4/1996 | Lin et al. ..................... 360/121 |
| 6,117,690 A * | 9/2000 | Bennett et al. ................. 438/3 |
| 6,512,246 B1 * | 1/2003 | Tanabe ........................ 257/72 |
| 6,515,957 B1 * | 2/2003 | Newns et al. ............... 369/126 |
| 6,870,710 B2 * | 3/2005 | Hida et al. ............... 360/294.4 |
| 7,141,999 B2 * | 11/2006 | Park et al. ................... 324/762 |
| 7,335,942 B2 * | 2/2008 | Edinger et al. .............. 257/328 |
| 7,349,186 B2 * | 3/2008 | Ito .......................... 360/324.2 |
| 7,402,736 B2 * | 7/2008 | Moon et al. ................. 438/551 |
| 2005/0218853 A1 * | 10/2005 | Kokami ...................... 318/599 |
| 2006/0044699 A1 * | 3/2006 | Hirano et al. ............ 360/294.4 |
| 2006/0114597 A1 * | 6/2006 | Chung et al. ................... 360/75 |
| 2006/0175644 A1 * | 8/2006 | Ko et al. ..................... 257/295 |
| 2006/0220161 A1 * | 10/2006 | Saito et al. .................. 257/421 |
| 2006/0256481 A1 * | 11/2006 | Kagami et al. ............. 360/317 |
| 2007/0028441 A1 * | 2/2007 | Cyrille et al. ............ 29/603.07 |
| 2007/0146938 A1 * | 6/2007 | Abiko ..................... 360/264.2 |
| 2009/0039335 A1 * | 2/2009 | Terao et al. ..................... 257/4 |

\* cited by examiner

ELECTRIC FIELD READ/WRITE HEAD AND METHOD OF MANUFACTURING SAME AND DATA READ/WRITE DEVICE

CROSS-REFERENCE TO RELATED PATENT APPLICATION

This application claims priority from Korean Patent Application No. 10-2006-0072925, filed on Aug. 2, 2006 in the Korean Intellectual Property Office, the disclosure of which is hereby incorporated in its entirety by reference.

BACKGROUND OF THE INVENTION

1. Field of the Invention

Apparatuses and methods consistent with the present invention relate to an electric field read/write head, and more particularly, to an electric field read/write head which is capable of increasing the recording density of a conventional hard disk drive (HDD).

2. Description of the Related Art

An HDD is used as a computer's primary storage device, and operates by spinning a data recording medium and suspending a read/write head over the data recording medium to read and write data. A related art HDD normally uses magnetic writing. That is, the related art HDD uses a magnetic field to create a plurality of magnetic domains, which are magnetized in a first direction on the magnetic recording medium and in a second direction opposite to the first direction. Magnetic domains magnetized in the first and second directions correspond to data '0' and data '1', respectively.

HDDs employing this magnetic writing method have undergone tremendous increases in their writing densities over the last few decades. Horizontal magnetic writing on HDDs can produce a recording density of approximately 100 $Gb/in^2$, and vertical magnetic writing on HDDs can produce a recording density of approximately 500 $Gb/in^2$.

However, because a magnetic field has the basic shape of a loop, it is difficult for a magnetic read/write head to form a strong localized magnetic field. This basic limitation restricts the ability of the magnetic writing method to increase the recording density.

Accordingly, in order to increase the recording density of HDDs that have used the magnetic writing method, other writing methods must be considered.

Recently, research has been conducted into ferroelectric writing media, on which data is written using electric fields, and corresponding electric field read/write heads. The electric field writing method uses an electric field to form electric domains, which are polarized in a first direction and in a second direction opposite to the first direction on a ferroelectric surface. Electric domains polarized in the first and second directions correspond to data '0' and data '1', respectively. Based on the polarized direction of an electric domain, the resistance of the electric field read/write head above that domain changes, so that the data written in the electric domain can be discerned.

An electric field read/write head for this electric field writing method has a scanning probe with a field effect transistor channel configuration and a scanning probe with a resistive tip. When scanning probe microscope (SPM) technology is used as the scanning probe, a stronger and more localized electric field can be emitted in electric field writing, thereby increasing recording density to 1 $Tb/in^2$ or higher.

However, in the electric field writing method based on SPM technology, a problem of friction and wear arises, due to contact between surfaces of a sharp probe and a recording medium. Also, in order to use a probe-type head to form a compact and large-capacity data storage device, several thousand probe arrays must be made, and the writing head must be linearly moved to precisely track over the thousands of probe arrays on the recording medium. Here, during a writing operation, signals must be applied separately to each probe, and during a reading operation, signals from the respective probes must be processed separately. These restrictive elements prohibit the realization of a compact and large capacity data storage device that uses electric field writing based on SPM technology.

Thus, new read/write heads that can overcome the problems of using probes need to be used, and an electric field writing-type data read/write device having a driving mechanism that is more secure and reliable is required.

While the above-described related art HDD has a driving mechanism that has been proven reliable over a long product lifespan, the mechanism is unsuitable for high-density data recording. On the other hand, while a data read/write device employing electric field writing based on SPM technology can produce a recording density of 1 $Tb/in^2$ or higher, it is still difficult to manufacture and operate its head structure and driving system.

Therefore, it is necessary to develop an HDD driving system to which electric field writing is applied, without incurring development costs required to make an electrical field writing-type HDD, with both a reliable driving system and a recording density of at least 1 $Tb/in^2$. To achieve such an HDD, an electric field read/write head which is capable of being suspended above a recording medium and appropriately performing reading and writing must first be developed.

SUMMARY OF THE INVENTION

Exemplary embodiments of the present invention overcome the above disadvantages and other disadvantages not described above.

The present invention provides a data read/write device which is capable of achieving a recording density of 1 $Tb/in^2$ or higher, while overcoming the problems of unstable driving systems of related art electric field writing data read/write devices based on SPM technology, and the ensuing manufacturing problems.

The present invention also provides an electric field read/write head for the above data read/write device, and a manufacturing method of the electric field read/write head.

According to an aspect of the present invention, there is provided an electric field read head including a semiconductor substrate which includes a first surface facing a recording medium and a second surface adjoining an edge of the first surface; a resistance region, which is a low density impurity region formed to extend from a central portion at one end of the first surface to the second surface; and a source region and a drain region, which are high density impurity regions formed at either side of the resistance region and separated from the first surface.

The electric field read head may further include an insulating layer formed on a portion of the second surface between the edge of the first surface of the substrate and the source region, and a portion of the second surface between the edge of the first surface of the substrate and the drain region.

The electric field read head may further include an insulating layer formed on a portion of the second surface between the edge of the first surface of the substrate and the source region, a portion of the second surface between the edge of the first surface of the substrate and the drain region, and portions of the source region and the drain region proximal to the edge of the first surface of the substrate.

The electric field read head may further include an insulating layer formed on a portion of the second surface between the edge of the first surface of the substrate and the source region, a portion of the second surface between the edge of the first surface of the substrate and the drain region, and the source region and the drain region.

The electric field read head may further include an insulating layer formed on the resistance region.

The electric field read head may further include a first electrode formed to electrically contact the source region; and a second electrode formed to electrically contact the drain region.

The electric field read head may further include an air bearing surface (ABS) pattern formed on the first surface of the substrate to suspend the electric field read head above a surface of the recording medium.

The substrate may be a p-type semiconductor, and the resistance region, the source region, and the drain region may be n-type impurity regions. Conversely, the substrate may be an n-type semiconductor, and the resistance region, the source region, and the drain region may be p-type impurity regions.

According to another aspect of the present invention, there is provided an electric field read/write head including a semiconductor substrate which includes a first surface facing a recording medium and a second surface adjoining an edge of the first surface; a resistance region, which is a low density impurity region formed to extend from a central portion at one end of the first surface to the second surface; a source region and a drain region, which are high density impurity regions formed at either side of the resistance region and separated from the first surface; and a write electrode formed on the resistance region with an insulating layer interposed between the write electrode and the resistance region.

The electric field read/write head may further include an insulating layer formed on a portion of the second surface between the edge of the first surface of the substrate and the source region, and a portion of the second surface between the edge of the first surface of the substrate and the drain region.

The electric field read/write head may further include an insulating layer formed on a portion of the second surface between the edge of the first surface of the substrate and the source region, a portion of the second surface between the edge of the first surface of the substrate and the drain region, and portions of the source region and the drain region proximal to the edge of the first surface of the substrate.

The electric field read/write head may further include an insulating layer formed on a portion of the second surface between the edge of the first surface of the substrate and the source region, a portion of the second surface between the edge of the first surface of the substrate and the drain region, and the source region and the drain region.

The electric field read/write head may further include a first electrode formed to electrically contact the source region; and a second electrode formed to electrically contact the drain region.

The electric field read/write head may further include an ABS pattern formed on the first surface of the substrate to suspend the electric field read/write head above a surface of the recording medium.

The substrate may be a p-type semiconductor, and the resistance region, the source region, and the drain region may be n-type impurity regions. Conversely, the substrate may be an n-type semiconductor, and the resistance region, the source region, and the drain region may be p-type impurity regions.

According to another aspect of the present invention, there is provided a method of manufacturing an electric field read/write head, including forming a stacked pattern of a first insulating layer and a metal layer for a write electrode on a second surface of a semiconductor substrate which includes a first surface facing a recording medium and a second surface with an edge adjoining the first surface, wherein the stacked pattern extends and expands from a central portion on the edge of the second surface adjoining the first surface to an opposite edge of the second surface; doping impurities in the second surface of the substrate at a high density using the stacked pattern as an ion implantation mask; diffusing the impurities to form a high density impurity region in the substrate on either side of the stacked pattern, and forming a resistance region that is a low density impurity region below the stacked pattern on a region of the substrate proximal to an edge of the first surface; removing the high density impurity region on either side of a portion of the resistance region proximal to the edge of the first surface, to form a source and a drain region that are high density impurity regions at either side of the resistance region separated from the edge of the first surface; and forming a second insulating layer at a height of the stacked pattern on a portion of the substrate from which the high density impurity region has been removed, and on the source region and the drain region.

The method may further include etching the second insulating layer to form contact holes through which the source region and drain region are exposed, respectively, after the forming of the second insulating layer; and forming a first electrode and a second electrode to contact the source region and the drain region, respectively, in the contact holes.

The method may further include forming an ABS pattern on the first surface of the substrate to suspend the electric field read/write head over the surface of the recording medium, after the forming of the second insulating layer.

According to another aspect of the present invention, there is provided a data read device including a recording medium with a ferroelectric recording layer and an electric field read head which reads data written on a recording medium, wherein the electric field read head includes a semiconductor substrate which includes a first surface facing a recording medium and a second surface adjoining an edge of the first surface; a resistance region, which is a low density impurity region formed to extend from a central portion at one end of the first surface to the second surface; and a source region and a drain region, which are high density impurity regions formed at either side of the resistance region and separated from the first surface.

The data read device may further include an insulating layer formed on a portion of the second surface between the edge of the first surface of the substrate and the source region, and a portion of the second surface between the edge of the first surface of the substrate and the drain region.

The data read device may further include an insulating layer formed on a portion of the second surface between the edge of the first surface of the substrate and the source region, a portion of the second surface between the edge of the first surface of the substrate and the drain region, and portions of the source region and the drain region proximal to the edge of the first surface of the substrate.

The data read device may further include an insulating layer formed on a portion of the second surface between the edge of the first surface of the substrate and the source region, a portion of the second surface between the edge of the first surface of the substrate and the drain region, and the source region and the drain region.

The data read device may further include a first electrode formed to electrically contact the source region; and a second electrode formed to electrically contact the drain region.

The data read device may further include an ABS pattern formed on the first surface of the substrate to suspend the electric field read head above a surface of the recording medium.

The recording medium may be a rotating disk-type medium, and the electric field read head may be suspended over and across a surface of the recording medium.

The data read device may further include a pivoting suspension on which the electric field read head is attached.

The substrate may be a p-type semiconductor, and the resistance region, the source region, and the drain region may be n-type impurity regions. Conversely, the substrate may be an n-type semiconductor, and the resistance region, the source region, and the drain region may be p-type impurity regions.

According to another aspect of the present invention, there is provided a data read/write device including a recording medium with a ferroelectric recording layer and an electric field read/write head which writes data on the recording medium and reads data from the recording medium, wherein the electric field read/write head includes a semiconductor substrate which includes a first surface facing the recording medium and a second surface adjoining an edge of the first surface; a resistance region, which is a low density impurity region formed to extend from a central portion at one end of the first surface to the second surface; a source region and a drain region, which are high density impurity regions formed at either side of the resistance region and separated from the first surface; and a write electrode formed on the resistance region with an insulating layer interposed between the write electrode and the resistance region.

The data read/write device may further include an insulating layer formed on a portion of the second surface between the edge of the first surface of the substrate and the source region, and a portion of the second surface between the edge of the first surface of the substrate and the drain region.

The data read/write device may further include an insulating layer formed on a portion of the second surface between the edge of the first surface of the substrate and the source region, a portion of the second surface between the edge of the first surface of the substrate and the drain region, and portions of the source region and the drain region proximal to the edge of the first surface of the substrate.

The data read/write device may further include an insulating layer formed on a portion of the second surface between the edge of the first surface of the substrate and the source region, a portion of the second surface between the edge of the first surface of the substrate and the drain region, and the source region and the drain region.

The data read/write device may further include a first electrode formed to electrically contact the source region; and a second electrode formed to electrically contact the drain region.

The data read/write device may further include an ABS pattern formed on the first surface of the substrate to suspend the electric field read/write head above a surface of the recording medium.

The recording medium may be a rotating disk-type medium, and the electric field read head may be suspended over and across a surface of the recording medium.

The data read/write device may further include a pivoting suspension on which the electric field read/write head is attached.

The substrate may be a p-type semiconductor, and the resistance region, the source region, and the drain region may be n-type impurity regions.

Conversely, the substrate may be an n-type semiconductor, and the resistance region, the source region, and the drain region may be p-type impurity regions.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
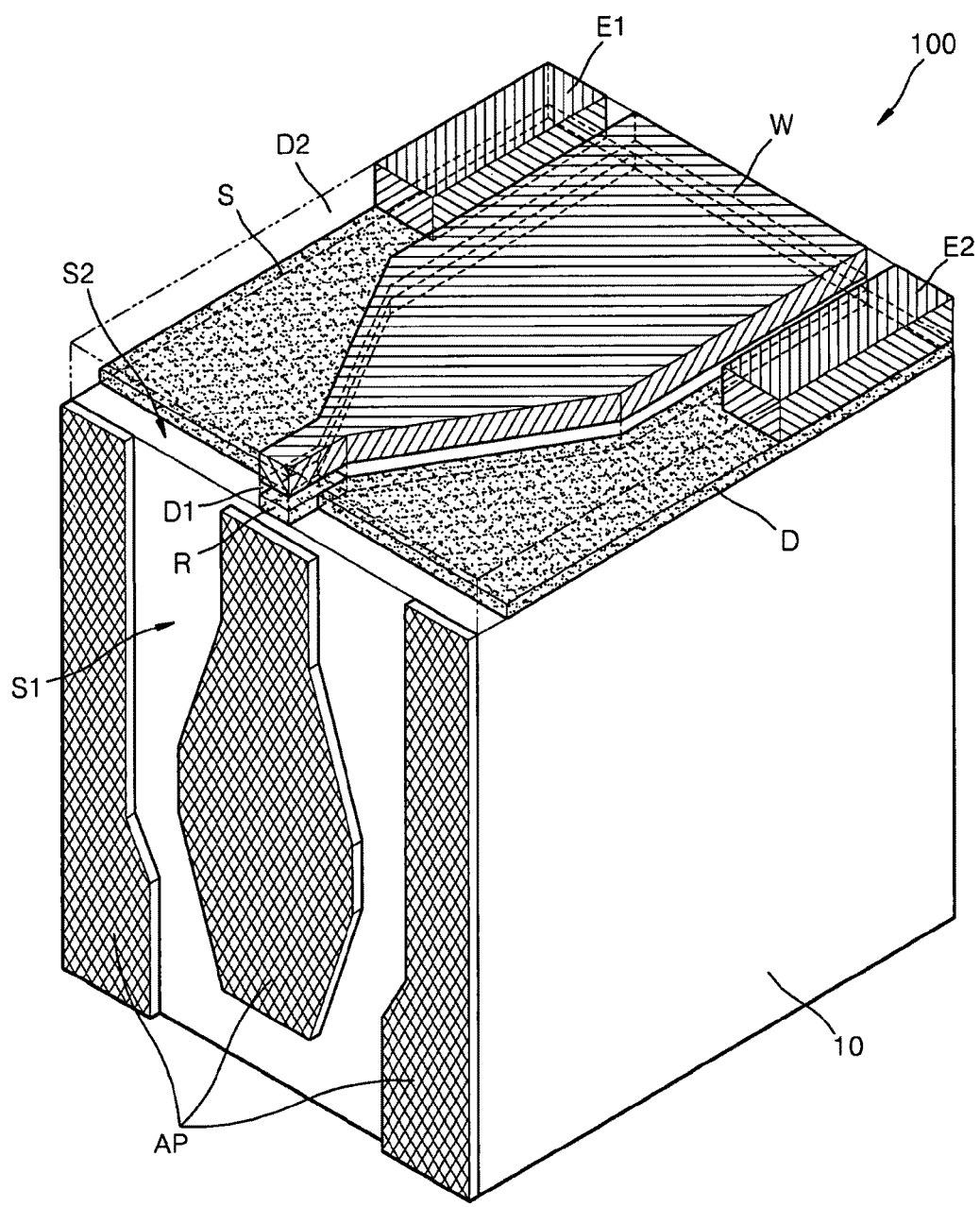
FIG. 1 is a perspective view of an electric field read/write head according to an exemplary embodiment of the present invention.

An electric field read/write head, its manufacturing method, and a data read/write device including the electric field read/write head, will now be described more fully with reference to the accompanying drawings, in which exemplary embodiments of the invention are shown. In the drawings, the widths and thicknesses of layers and regions are exaggerated for clarity. Like reference numerals in the drawings denote like elements, and thus their description will be omitted.

FIG. 1 is a perspective view of an electric field read/write head according to an exemplary embodiment of the present invention.

Referring to FIG. 1, the semiconductor substrate 10 of the electric field read/write head 100 according to an exemplary embodiment of the present invention includes a first surface S1 facing a recording medium and a second surface S2 adjoining an edge of the first surface S1. Here, the substrate 10 may be a p-type or an n-type six-surfaced structure, and the first surface S1 may be perpendicular to the second surface S2.

A resistance region R, which is a low density impurity region, is formed to extend from a center portion at one edge of the first surface S1 to the second surface S2. The resistance region R extends over only a portion of the second surface S2, and not to the end thereof. Source region S and drain region D, which are high-density impurity regions, are formed on either side of the resistance region R and are separated from the first surface S1. The source region S and the drain region D may contact portions of the resistance region R and extend to the end of the second surface S2. If the substrate 10 is a p-type semiconductor, the resistance region R, the source region S, and the drain region D are n-type impurity regions, and if the substrate 10 is an n-type semiconductor, the resistance region R, the source region S, and the drain region D are p-type impurity regions.

A write electrode W is formed on the resistance region R with a first insulating layer D1 interposed therebetween. The first insulating layer D1 and the write electrode W may also extend to the end of the second surface S2.

The region of the second surface S2 without the write electrode W formed thereon, the source region S, and the drain region D, that is, the portion of the second surface S2 between the source region S and the edge of the first surface S1 of the substrate 10, the portion of the second surface S2 between the drain region D and the edge of the first surface S1 of the substrate 10, and the top surfaces of the source region S and the drain region D, all have a second insulating layer D2 formed up to the height of the write electrode W. Furthermore, a first electrode E and a second electrode E2 may be formed in the second insulating layer D2 to electrically contact the source region S and the drain region D, respectively.

Although not illustrated, the location and thickness of the second insulating layer D2 may vary. The second insulating layer D2 may be formed on a portion of the second surface S2 between the end of the first surface S1 of the substrate 10 and the source region S, and on a portion of the second surface S2 between the end of the first surface S1 of the substrate 10 and the drain region D. The second insulating layer D2 may also be formed only on the portion of the second surface S2 between the end of the first surface S1 of the substrate 10 and the source region S, the portion of the second surface S2 between the end of the first surface S1 of the substrate 10 and the drain region D, and on the portions of the source region S and the drain region D that are proximal to the end of the first surface S1.

As illustrated in FIG. 1, an ABS pattern AP is formed on the first surface S1 of the substrate 10. The ABS pattern AP allows the electric field read/write head 100 on which it is formed to be suspended over a recording medium.

FIGS. 2A through 2F are plan views of manufacturing stages of an electric field read/write head according to an exemplary embodiment of the present invention, and FIGS. 3A through 3F are sectional views of FIGS. 2A through 2F taken along the A-A' line of FIGS. 2A through 2F, respectively.

Figure 2A:
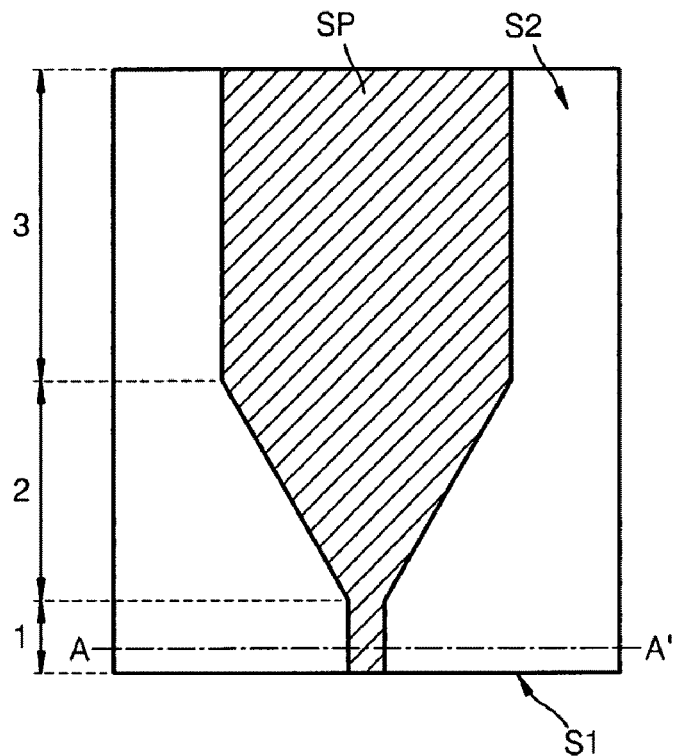
FIGS. 2A through 2F are plan views of manufacturing stages of an electric field read/write head according to an exemplary embodiment of the present invention.
Figure 3A:
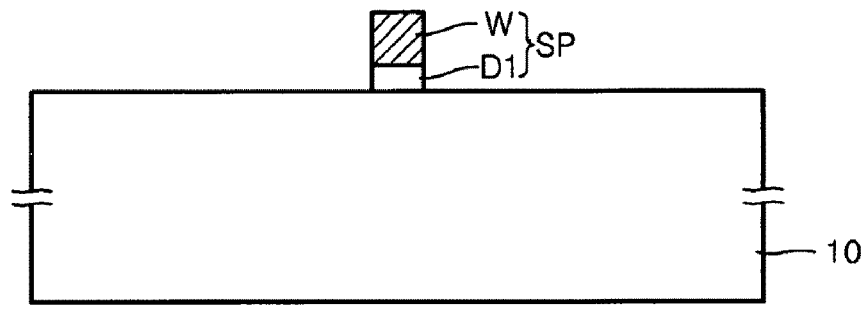
FIGS. 3A through 3F are sectional views of FIGS. 2A through 2F taken along the A-A' line of FIGS. 2A through 2F, respectively.

Referring to FIGS. 2A and 3A, a stacked pattern SP, formed by a write electrode metal layer W stacked on the first insulating layer D1, is formed on the second surface S2 of the semiconductor substrate 10, including the first surface S1 and the second surface S2 that intersects with an edge of the first surface S1. Here, the substrate 10 may be a p-type or an n-type semiconductor. The stacked pattern SP begins on the second surface S2 at the center of the intersecting edge of the first surface S1 and the second surface S2, and extends to the opposite edge of the second surface S2, widening as it progresses toward that end. In further detail, as illustrated in FIG. 2A, the stacked pattern SP includes a first portion 1 that begins at the edge of the first surface S1 with a narrow width, a second portion 2 connected to the first portion 1 and gradually increasing in width therefrom, and a third portion 3 connected to the second portion 2 and extending to the edge of the second surface S2 and having a greater width.

Figure 2B:
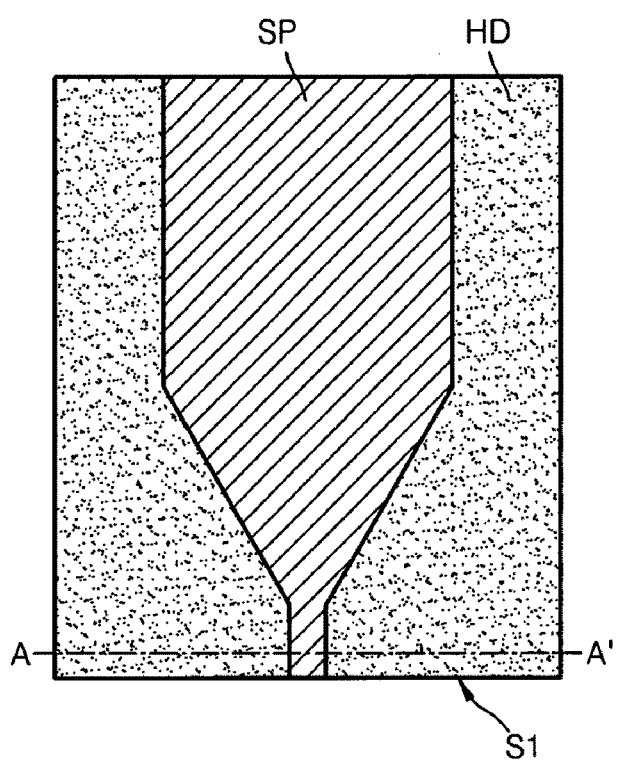
Figure 3B:
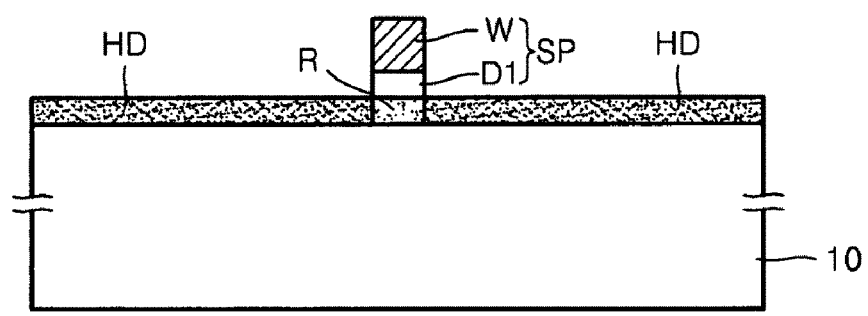

Referring to FIGS. 2B and 3B, the second surface S2 is doped at a high density with an impurity using the stacked pattern SP as an ion implantation mask. Here, the impurity may be an n-type impurity if the substrate 10 is a p-type semiconductor, and the impurity may be a p-type impurity if the substrate 10 is an n-type semiconductor.

Next, the impurity is diffused by annealing to form a high density impurity region HD on either side of the stacked pattern SP on the substrate, and at the same time, a resistance region R, which is a low density impurity region, is formed at a region of the substrate under the first portion 1 of the stacked pattern SP proximal to the edge of the first surface S1.

Figure 2C:
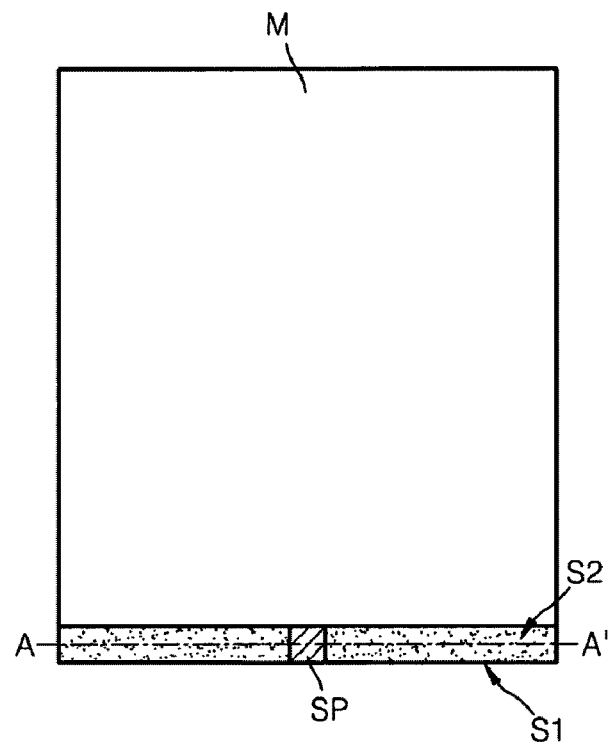
Figure 3C:
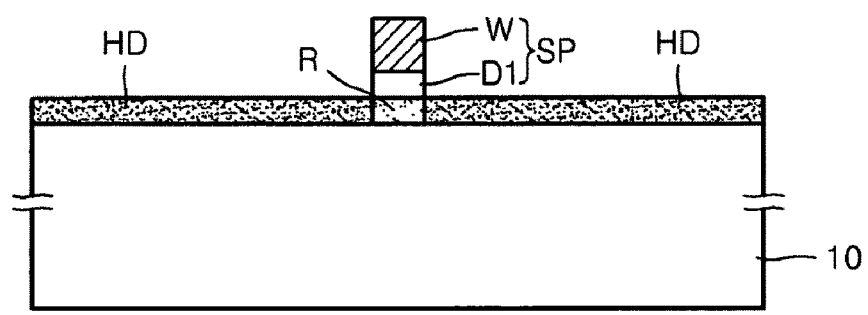

Referring to FIGS. 2C and 3C, a mask layer M is formed on the substrate for exposing part of the first portion 1 of the stacked pattern SP adjacent to the first surface S1 and the high density impurity region HD to either side of the part of the first portion 1. The mask layer M may be made of a photosensitive layer.

Figure 2D:
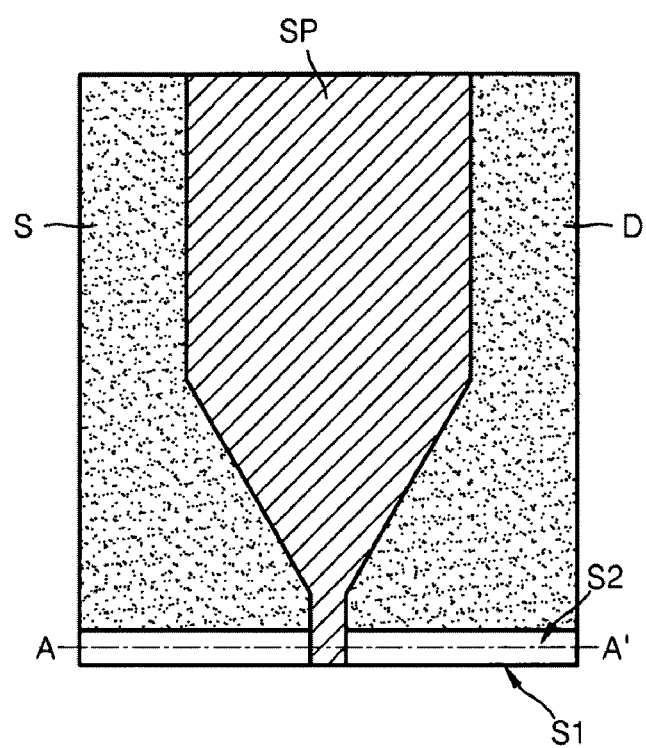
Figure 3D:
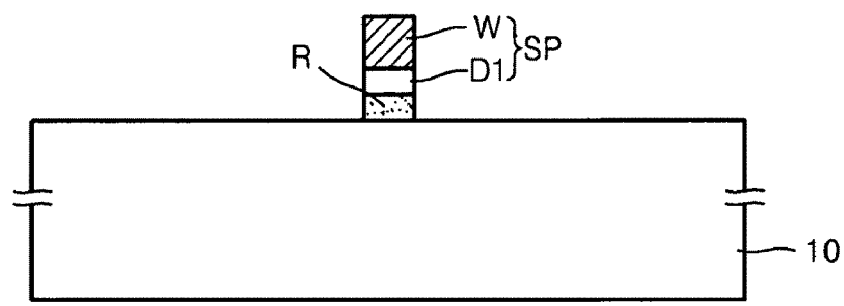

Referring to FIGS. 2D and 3D, the mask layer M is used as an etching mask in order to remove the portion of the high density impurity region HD on either side of the portion of the resistance region R which intersects the first surface S1. Next, the mask layer M is selectively removed by ashing or an alternate process. Thus, the source region S and the drain region D that are separated from the end of the first surface S1 and disposed at either side of the resistance region R, are formed.

Figure 2E:
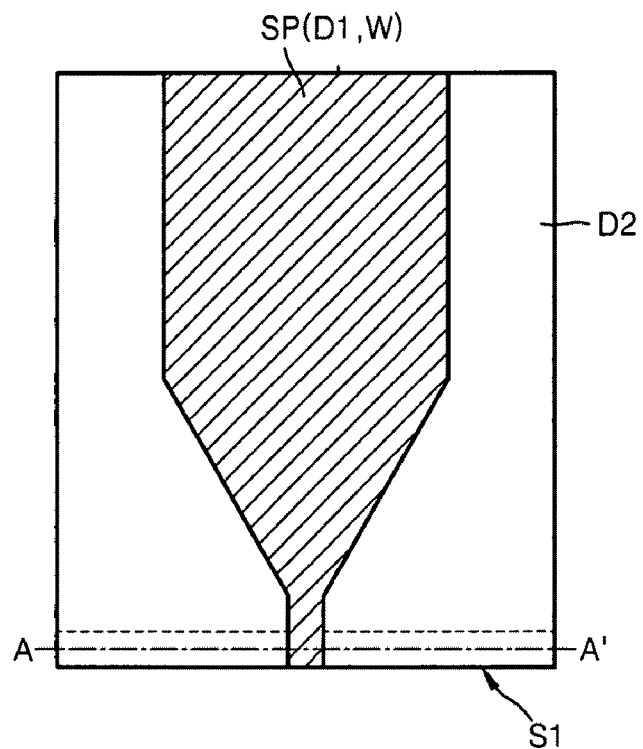
Figure 3E:
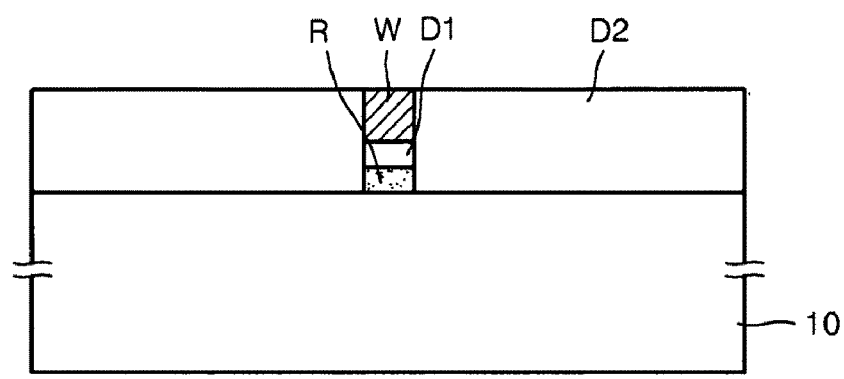

Referring to FIGS. 2E and 3E, after an insulating layer is formed on the entire surface of the resulting structure of the second surface S2 in order to cover the stacked pattern SP, the insulating layer undergoes chemical mechanical polishing (CMP) until the stacked pattern SP is exposed. Accordingly, a second insulating layer D2 is formed at a same height level as that of the stacked pattern SP on the exposed portion of the substrate 10, from which the high density impurity region has been removed, the source region S, and the drain region D. The second insulating layer D2 may be a silicon oxide layer.

Figure 2F:
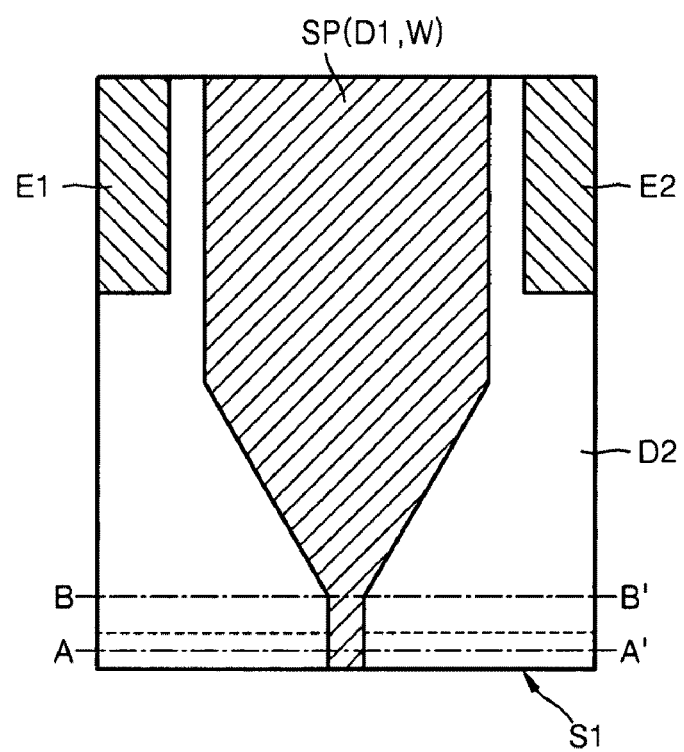
Figure 3F:
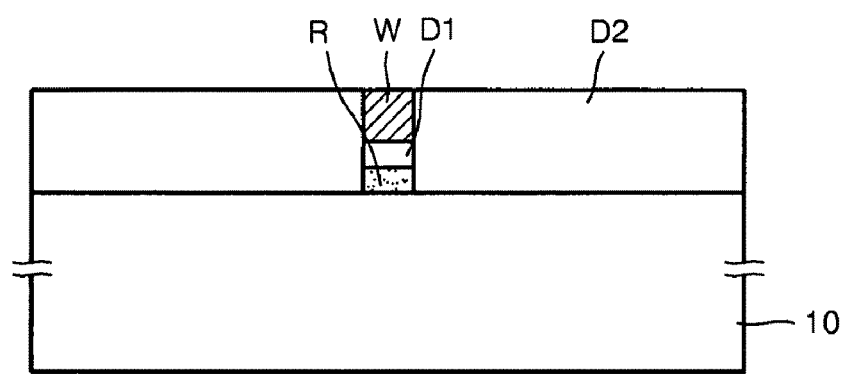

Referring to FIGS. 2F and 3F, the second insulating layer D2 is etched to form contact holes for exposing the source region S and the drain region D, respectively. Then, a first electrode E1 and a second electrode E2 are formed for contacting the source region S and the drain region D in the contact holes.

Thereafter, an ABS pattern AP (not shown) for suspending the first surface S1 of the substrate 10 over the surface of a recording medium is formed.

Figure 4:
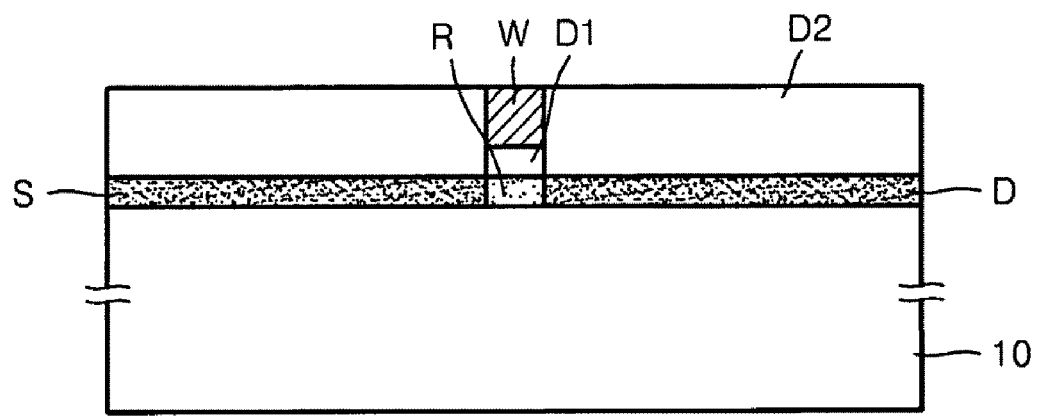
FIG. 4 is a sectional view of FIG. 2F taken along the B-B' line of FIG. 2F.

FIG. 4 is a sectional view of FIG. 2F taken along the B-B' line of FIG. 2F. Referring to FIGS. 2F, 3F, and 4, the source region S and the drain region D are separated from the first surface S1. That is, in the electric field read/write head of an exemplary embodiment of the present invention, the source region S and the drain region D are separated by a predetermined distance from the recording medium, and the second insulating layer D2 is interposed therebetween.

Although not shown, the process of manufacturing the electric field read/write head 100 of an exemplary embodiment of the present invention from a wafer will now be briefly described. The manufacturing method includes forming at least one set of a resistance region R, a source region S and a drain region D, a first insulating layer D1, a write electrode W, and a second insulating layer D2; separating the sets into several groups in order to divide the sets into units; forming an ABS pattern AP on the surface of the unit to face the recording medium; and separating the units with ABS patterns AP formed thereon into respective electric field read/write heads.

Figure 5:
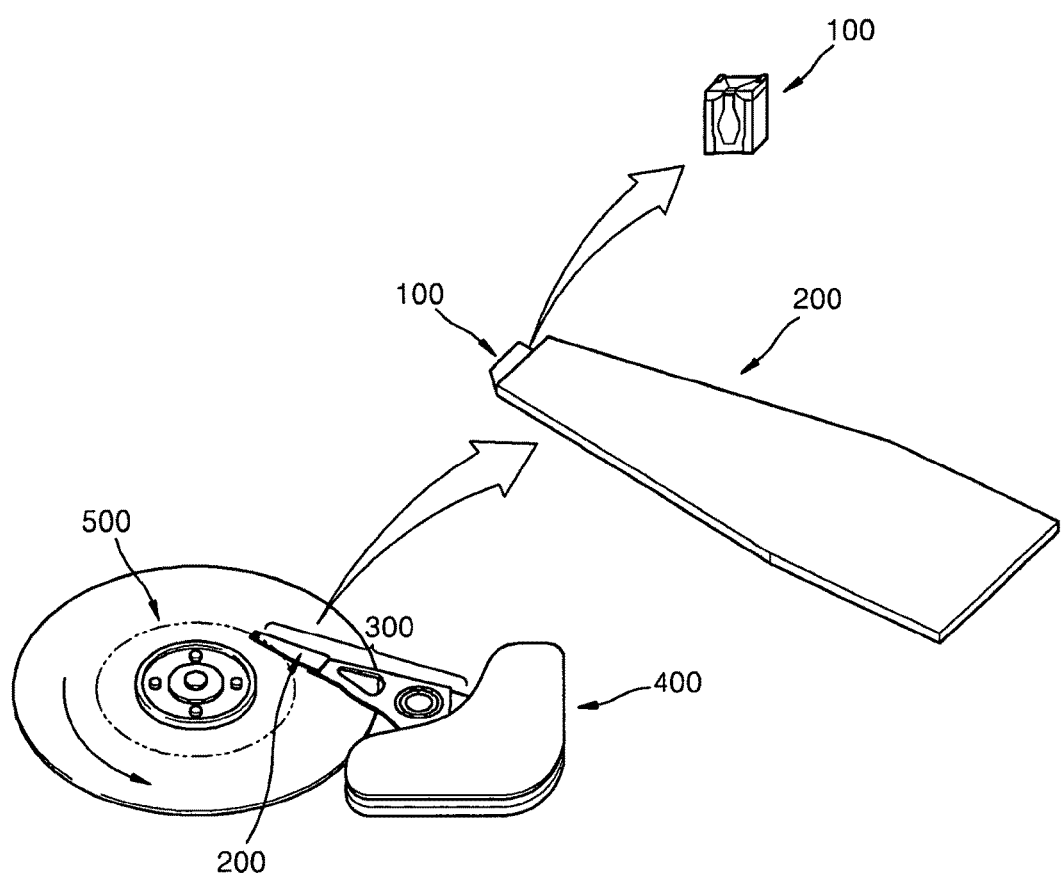
FIG. 5 is an exploded view of a data read/write device including an electric field read/write head according to an exemplary embodiment of the present invention.

FIG. 5 is an exploded view of a data read/write device including an electric field read/write head 100 according to an exemplary embodiment of the present invention.

Referring to FIG. 5, the data read/write device includes a recording medium 500 with a ferroelectric recording layer, and an electric field read/write head 100 that writes data on the recording medium 500 and reads data from the recording medium 500. Here, the electric field read/write head 100 is the same as the electric field read/write head 100 of FIG. 1, so that a detailed description thereof shall not be repeated.

The recording medium of the data read/write device is a rotating disk-type medium having a lower electrode (not shown) provided therebelow. The lower electrode may be grounded. The electric field read/write head is attached to a suspension 200 at the tip of a swing arm 300, and suspended close to the surface of the recording medium 500. Reference number 400 signifies a voice coil motor (VCM). The data read/write device employs a ferroelectric recording medium as the recording medium and the above-described electric field read/write head, instead of the magnetic field read/write head as in a related art HDD.

The reading and writing principles of the inventive data read/write device will now be briefly described.

Reading Principles

When the source region S and the drain region D of the electric field read/write head 100 are n+ regions, the resistance region R is a n– region, and the surface of the recording medium 500 where the resistance region R is located has a negative (–) charge, the density of electrons in the resistance region R is reduced so that the resistance value of the resistance region R increases and current between the source region S and the drain region D decreases. Conversely, when the surface of the recording medium 500 where the resistance region R is located has a positive (+) charge, the electron density in the resistance region R increases to reduce the resistance value of the resistance region R and increase the current between the source region S and the drain region D. By detecting the changes in these resistance and current values, the data on the surface of the recording medium 500 can be read.

Writing Principles

When a positive (+) voltage exceeding a critical voltage is applied to the write electrode W of the electric field read/write head 100, the surface of the recording medium 500 becomes negatively (–) charged, because the lower electrode disposed beneath the recording medium 500 is at 0V. On the other hand, when a negative voltage (–) under a critical voltage is applied to the electric field read/write head 100, the surface of the recording medium 500 becomes positively (+) charged, because the lower electrode disposed beneath the recording medium 500 is at 0V. Accordingly, the polarity of the ferroelectric recording medium 500 shifts based on the voltage applied to the write electrode W, and data can be written.

The electric field read/write head 100, as shown in FIGS. 1 and 5, has the source region S and the drain region D disposed further from the recording medium 500 than the resistance region R, and the second insulating layer D2 interposed between the source region S and the drain region D and the resistance region R. These types of recessed or buried source region S and the drain region D are structured in this manner for the following reasons.

If the source region S and the drain region D were on the same level surface as the resistance region R, the voltage Vd applied to the source region S and the drain region D for reading the data could change the polarity of the surface of the recording medium proximal to the source region S and the drain region D in an undesired direction. That is, during reading operation, undesired writing may be performed. Therefore, only the resistance region R is exposed to the medium, while the source region S and the drain region D are separated from the surface of the medium or separated from the surface of the medium and buried. This explanation can be substantiated by the data in FIGS. 6 and 7.

Figure 6:
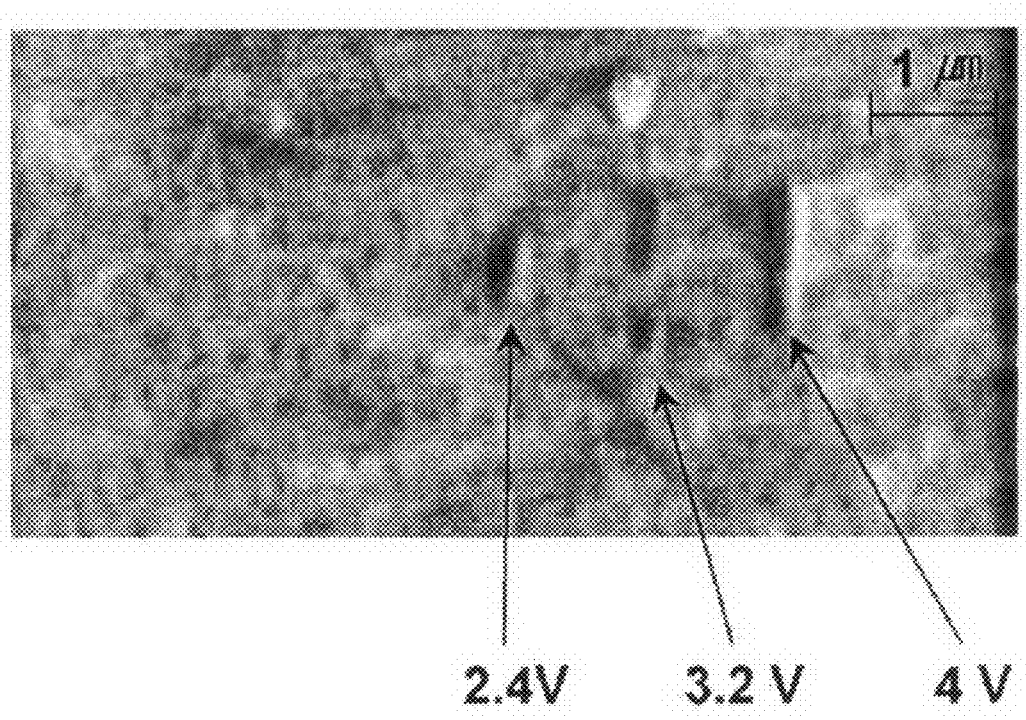
FIG. 6 is a plan photograph of a ferroelectric recording medium displaying an inversion phenomenon of an electric domain according to writing bias.

FIG. 6 is a plan photograph of a ferroelectric recording medium displaying an inversion phenomenon of an electric domain according to writing bias. For this test, a recording medium with a 60 nm thickness was used, and a probe type writing head was used for convenience. The portions in the photograph that are darkened are inversed domain regions.

Referring to FIG. 6, although the sizes of the inversed regions are reduced by reducing the writing voltage from 4V to 3.2V to 2.4V, inversion of the electric domain still occurs, even at the writing voltage of 2.4V.

Figure 7:
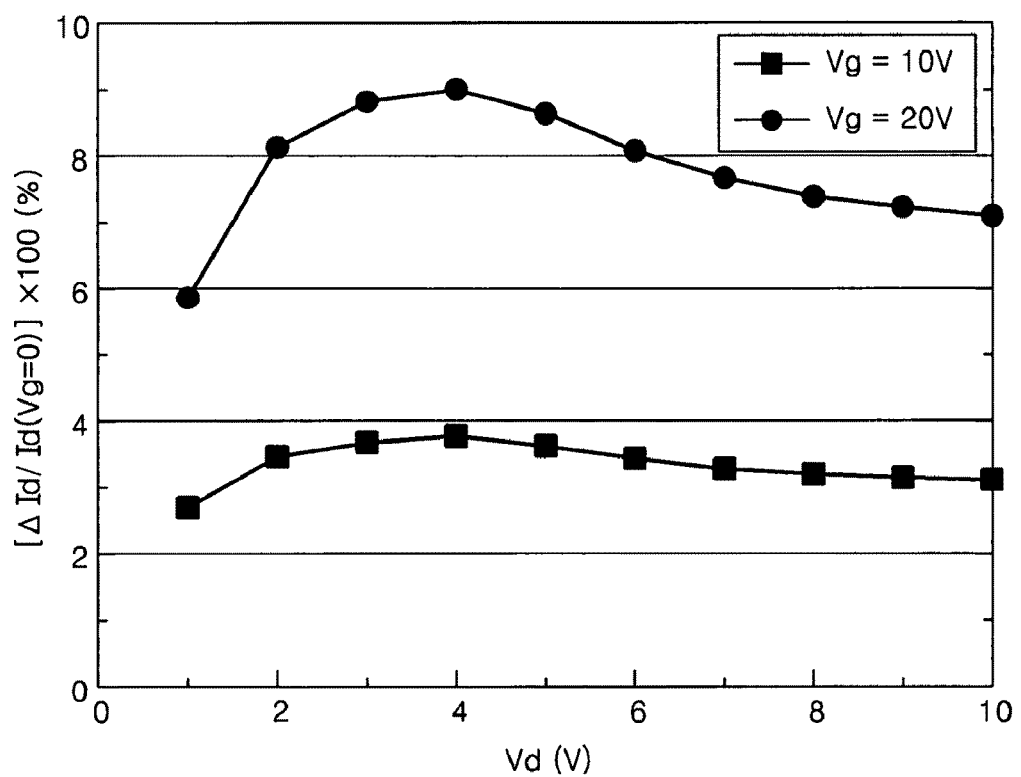
FIG. 7 is a graph illustrating the relationship between sensitivity and a voltage (Vd) applied between a source region (S) and a drain region (D).

FIG. 7 is a graph illustrating the relationship between sensitivity and a voltage (Vd) applied between a source region S and a drain region D. Here, $\Delta Id$ indicates the difference between the current Id' between the source region S and the drain region D when the surface charge of the recording medium is positive (+), and the current Id" between the source region S and the drain region D when the surface charge of the recording medium is negative (–). Also, Id(Vg=0) is a current value between the source region S and the drain region D when the recording medium does not have a polarity. Thus, the sensitivity (%) is $[\Delta id/Id(Vg=0)] \times 100$. Vg is the strength of the voltage applied to the recording medium itself.

Referring to FIG. 7, when Vd is approx. 4V, the sensitivity is at a maximum. Therefore, an optimum sensitivity can be realized by applying an appropriately high Vd.

Referring to FIGS. 6 and 7, in order to achieve an optimum sensitivity, a Vd of around 4V is used. When such a Vd is used, it can cause the occurrence of an unwanted inversion of the electric field on the surface of the recording medium. Therefore, exemplary embodiments of the present invention can prevent the occurrence of unwanted writing during reading by using recessed or buried source region S and the drain region D on an electric field read/write head and a data read/write device using the head.

The data read/write device of exemplary embodiments of the present invention has an HDD driving system to which an electric field-type writing is applied. Thus, when the method of exemplary embodiments of the present invention is used, there is no need to develop a new system, and reliable driving can be realized in an HDD having a recording density of 1 Tb/in$^2$ or higher. Accordingly, exemplary embodiments of the present invention are able to use related art HDD mechanisms, while overcoming the recording density restrictions of related art HDDs.

Also, in the manufacturing method of the electric field read/write head of exemplary embodiments of the present invention, because the write electrode W and the resistance region R are arranged together, no misaligning problems occur between the two components, thus simplifying the manufacturing process.

While an electric field read/write head and a data read/write device using the head have been described above according to exemplary embodiments of the present invention, they are not limited to the above description. For example, the basic principle of the present invention may be applied to an electric field read head that performs only reading of data, and a data read device using the read head. That is, the write electrode W or the first insulating layer D1 and the write electrode W illustrated in FIGS. 1 through 5 may be removed, and the remaining elements may remain the same in order to compose an electric field read head and a data read device including the read head.

As described above, by applying an electric field reading method to the driving system of an HDD, there is no need to develop a system, and the data read/write device can be reliably driven, while achieving a recording density of 1 Tb/in$^2$ or higher.

Since the electric field read/write head of exemplary embodiments of the present invention has recessed or buried source and drain regions, the data read/write device of exemplary embodiments of the present invention can prevent the occurrence of unwanted writing during reading of data, caused by a voltage applied to the source and drain regions.

Additionally, in the manufacturing method of the electric field read/write head of exemplary embodiments of the present invention, because the write electrode and the resistance region are defined together, there is no misalignment of the two portions, thereby simplifying the manufacturing process.

While the present invention has been particularly shown and described with reference to exemplary embodiments thereof, it will be understood by those of ordinary skill in the art that various changes in form and details may be made therein without departing from the spirit and scope of the present invention as defined by the following claims and their legal equivalents.

What is claimed is:

1. An electric field read head comprising:
   a semiconductor substrate which includes a first surface facing a recording medium and a second surface adjoining an edge of the first surface;
   a resistance region, which is a low density impurity region formed to extend from a central portion at one end of the first surface to the second surface; and
   a source region and a drain region, which are high density impurity regions formed at either side of the resistance region and separated from the first surface.

2. The electric field read head of claim 1, further comprising an insulating layer formed on a portion of the second surface between the edge of the first surface of the substrate and the source region, and a portion of the second surface between the edge of the first surface of the substrate and the drain region.

3. The electric field read head of claim 1, further comprising an insulating layer formed on a portion of the second surface between the edge of the first surface of the substrate and the source region, a portion of the second surface between the edge of the first surface of the substrate and the drain region, and portions of the source region and the drain region proximal to the edge of the first surface of the substrate.

4. The electric field read head of claim 1, further comprising an insulating layer formed on a portion of the second surface between the edge of the first surface of the substrate and the source region, a portion of the second surface between the edge of the first surface of the substrate and the drain region, and the source region and the drain region.

5. The electric field read head of claim 1, further comprising an insulating layer formed on the resistance region.

6. The electric field read head of claim 1, further comprising:
   a first electrode formed to electrically contact the source region; and
   a second electrode formed to electrically contact the drain region.

7. The electric field read head of claim 1, further comprising an air bearing surface (ABS) pattern formed on the first surface of the substrate to suspend the electric field read head above a surface of the recording medium.

8. The electric field read head of claim 1, wherein the substrate is a p-type semiconductor, and the resistance region, the source region, and the drain region are n-type impurity regions.

9. The electric field read head of claim 1, wherein the substrate is an n-type semiconductor, and the resistance region, the source region, and the drain region are p-type impurity regions.

10. An electric field read/write head comprising:
    a semiconductor substrate which includes a first surface facing a recording medium and a second surface adjoining an edge of the first surface;
    a resistance region, which is a low density impurity region formed to extend from a central portion at one end of the first surface to the second surface;
    a source region and a drain region, which are high density impurity regions formed at either side of the resistance region and separated from the first surface; and
    a write electrode formed on the resistance region with an insulating layer interposed between the write electrode and the resistance region.

11. The electric field read/write head of claim 10, further comprising an insulating layer formed on a portion of the second surface between the edge of the first surface of the substrate and the source region, and a portion of the second surface between the edge of the first surface of the substrate and the drain region.

12. The electric field read/write head of claim 10, further comprising an insulating layer formed on a portion of the second surface between the edge of the first surface of the substrate and the source region, a portion of the second surface between the edge of the first surface of the substrate and the drain region, and portions of the source region and the drain region proximal to the edge of the first surface of the substrate.

13. The electric field read/write head of claim 10, further comprising an insulating layer formed on a portion of the second surface between the edge of the first surface of the substrate and the source region, a portion of the second surface between the edge of the first surface of the substrate and the drain region, and the source region and the drain region.

14. The electric field read/write head of claim 10, further comprising:
    a first electrode formed to electrically contact the source region; and
    a second electrode formed to electrically contact the drain region.

15. The electric field read/write head of claim 10, further comprising an air bearing surface (ABS) pattern formed on the first surface of the substrate to suspend the electric field read/write head above a surface of the recording medium.

16. The electric field read/write head of claim 10, wherein the substrate is a p-type semiconductor, and the resistance region, the source region, and the drain region are n-type impurity regions.

17. The electric field read/write head of claim 10, wherein the substrate is an n-type semiconductor, and the resistance region, the source region, and the drain region are p-type impurity regions.

18. A data read device comprising a recording medium with a ferroelectric recording layer and an electric field read head which reads data written on a recording medium, wherein the electric field read head comprises:
    a semiconductor substrate which includes a first surface facing the recording medium and a second surface adjoining an edge of the first surface;

a resistance region, which is a low density impurity region formed to extend from a central portion at one end of the first surface to the second surface; and a source region and a drain region, which are high density impurity regions formed at either side of the resistance region and separated from the first surface.

19. The data read device of claim 18, further comprising an insulating layer formed on a portion of the second surface between the edge of the first surface of the substrate and the source region, and a portion of the second surface between the edge of the first surface of the substrate and the drain region.

20. The data read device of claim 18, further comprising an insulating layer formed on a portion of the second surface between the edge of the first surface of the substrate and the source region, a portion of the second surface between the edge of the first surface of the substrate and the drain region, and portions of the source region and the drain region proximal to the edge of the first surface of the substrate.

21. The data read device of claim 18, further comprising an insulating layer formed on a portion of the second surface between the edge of the first surface of the substrate and the source region, a portion of the second surface between the edge of the first surface of the substrate and the drain region, and the source region and the drain region.

22. The data read device of claim 18, further comprising:
a first electrode formed to electrically contact the source region; and
a second electrode formed to electrically contact the drain region.

23. The data read device of claim 18, further comprising an air bearing surface (ABS) pattern formed on the first surface of the substrate to suspend the electric field read head above a surface of the recording medium.

24. The data read device of claim 18, wherein the recording medium is a rotating disk-type medium, and the electric field read head is suspended over and across a surface of the recording medium.

25. The data read device of claim 18, further comprising a pivoting suspension on which the electric field read head is attached.

26. The data read device of claim 18, wherein the substrate is a p-type semiconductor, and the resistance region, the source region, and the drain region are n-type impurity regions.

27. The data read device of claim 18, wherein the substrate is an n-type semiconductor, and the resistance region, the source region, and the drain region are p-type impurity regions.

28. A data read/write device comprising a recording medium with a ferroelectric recording layer and an electric field read/write head which writes data on a recording medium and reads data from the recording medium, wherein the electric field read/write head includes:
a semiconductor substrate which includes a first surface facing a recording medium and a second surface adjoining an edge of the first surface;
a resistance region, which is a low density impurity region formed to extend from a central portion at one end of the first surface to the second surface;
a source region and a drain region, which are high density impurity regions formed at either side of the resistance region and separated from the first surface; and
a write electrode formed on the resistance region with an insulating layer interposed between the write electrode and the resistance region.

29. The data read/write device of claim 28, further comprising an insulating layer formed on a portion of the second surface between the edge of the first surface of the substrate and the source region, and a portion of the second surface between the edge of the first surface of the substrate and the drain region.

30. The data read/write device of claim 28, further comprising an insulating layer formed on a portion of the second surface between the edge of the first surface of the substrate and the source region, a portion of the second surface between the edge of the first surface of the substrate and the drain region, and portions of the source region and the drain region proximal to the edge of the first surface of the substrate.

31. The data read/write device of claim 28, further comprising an insulating layer formed on a portion of the second surface between the edge of the first surface of the substrate and the source region, a portion of the second surface between the edge of the first surface of the substrate and the drain region, and the source region and the drain region.

32. The data read/write device of claim 28, further comprising:
a first electrode formed to electrically contact the source region; and
a second electrode formed to electrically contact the drain region.

33. The data read/write device of claim 28, further comprising an air bearing surface (ABS) pattern formed on the first surface of the substrate to suspend the electric field read/write head above a surface of the recording medium.

34. The data read/write device of claim 28, wherein the recording medium is a rotating disk-type medium, and the electric field read head is suspended over and across a surface of the recording medium.

35. The data read/write device of claim 28, further comprising a pivoting suspension on which the electric field read head is attached.

36. The data read/write device of claim 28, wherein the substrate is a p-type semiconductor, and the resistance region, the source region, and the drain region are n-type impurity regions.

37. The data read/write device of claim 28, wherein the substrate is an n-type semiconductor, and the resistance region, the source region, and the drain region are p-type impurity regions.

* * * * *